United States Patent
Zhang et al.

(10) Patent No.: US 12,414,563 B2
(45) Date of Patent: Sep. 16, 2025

(54) ENCAPSULATION OF CYCLOHEXANEDIONES PROCESS AND PRODUCT

(71) Applicant: Arysta LifeScience Inc., Cary, NC (US)

(72) Inventors: Hong Zhang, Cary, NC (US); Rachel Louise Branaghan, Fishbourne (GB); Sarah Jane Maude, Chadbury (GB)

(*) Notice: Subject to any disclaimer, the term of this patent is extended or adjusted under 35 U.S.C. 154(b) by 1162 days.

(21) Appl. No.: 17/291,508

(22) PCT Filed: Nov. 12, 2019

(86) PCT No.: PCT/US2019/060981
§ 371 (c)(1),
(2) Date: May 5, 2021

(87) PCT Pub. No.: WO2020/102232
PCT Pub. Date: May 22, 2020

(65) Prior Publication Data
US 2022/0000105 A1     Jan. 6, 2022

Related U.S. Application Data

(60) Provisional application No. 62/760,565, filed on Nov. 13, 2018.

(51) Int. Cl.
| | |
|---|---|
| *A01N 35/10* | (2006.01) |
| *A01N 25/02* | (2006.01) |
| *A01N 25/10* | (2006.01) |
| *A01N 25/22* | (2006.01) |
| *A01N 25/28* | (2006.01) |

(52) U.S. Cl.
CPC .............. *A01N 35/10* (2013.01); *A01N 25/02* (2013.01); *A01N 25/10* (2013.01); *A01N 25/22* (2013.01); *A01N 25/28* (2013.01)

(58) Field of Classification Search
CPC ................................ A01N 25/28; A01N 35/10
See application file for complete search history.

(56) References Cited

U.S. PATENT DOCUMENTS

| | | | |
|---|---|---|---|
| 4,952,722 A | 8/1990 | Serban et al. | |
| 5,922,357 A | 7/1999 | Coombes et al. | |
| 2010/0248963 A1* | 9/2010 | Becher | A01N 37/26 504/144 |
| 2011/0301036 A1 | 12/2011 | Tank et al. | |
| 2014/0080712 A1 | 3/2014 | Lao et al. | |
| 2018/0139956 A1* | 5/2018 | Ishibashi | A01N 47/12 |

FOREIGN PATENT DOCUMENTS

| | | |
|---|---|---|
| CN | 101427672 A | 5/2009 |
| CN | 102388864 A | 3/2012 |
| CN | 101396018 B | 5/2012 |
| CN | 101990890 B | 2/2013 |
| RU | 2488437 C1 | 7/2013 |
| WO | 2005102045 A1 | 11/2005 |
| WO | 2010093970 A2 | 8/2010 |
| WO | 2012080208 A1 | 6/2012 |
| WO | 2013158620 A1 | 10/2013 |

OTHER PUBLICATIONS

International Search Report and Written Opinion for International Application PCT/US2019/060981; International Filing Date: Nov. 11, 2019; Date of Mailing: Jan. 31, 2020; 10 pages.

* cited by examiner

*Primary Examiner* — Gina C Justice
(74) *Attorney, Agent, or Firm* — CANTOR COLBURN LLP

(57) ABSTRACT

Encapsulation of cyclohexanediones process and product. A composition particularly adapted for herbicidal use is described, including biopolymer micro-capsules containing one or more cyclohexanediones encapsulated therein, resulting in enhanced chemical stability and dispersibility of the encapsulated cyclohexanediones for such use. A complex coacervation method of forming such microcapsules is also described.

14 Claims, 1 Drawing Sheet

```
┌─────────────────────────┐
│   RAW MATERIALS ADDED   │
│     TOGETHER AND        │
│   THOROUGHLY MIXED      │
│                       1 │
└───────────┬─────────────┘
            ▼
┌─────────────────────────┐
│   GENTLY STIRRED AND    │
│   STORED +/- HEAT TO    │
│  ENHANCE DISSOLUTION    │
│                       2 │
└───────────┬─────────────┘
            ▼
┌─────────────────────────┐
│   SURFACTANTS ADDED     │
│                       3 │
└───────────┬─────────────┘
            ▼
┌─────────────────────────┐
│   CLETHODIM SOLUTION    │
│        ADDED            │
│                       4 │
└───────────┬─────────────┘
            ▼
┌─────────────────────────┐
│  HOMOGENIZED TO FORM    │
│  MICROEMULSIONS WITH    │
│      ENRICHED           │
│     BIOPOLYMERS AT      │
│      INTERFACE          │
│                       5 │
└───────────┬─────────────┘
            ▼
┌─────────────────────────┐
│   SPRAY DIRED TO FORM   │
│    MICROCAPSULE IN      │
│    POWDER FORM        6 │
└─────────────────────────┘
```

ENCAPSULATION OF CYCLOHEXANEDIONES PROCESS AND PRODUCT

CROSS REFERENCE TO RELATED APPLICATIONS

This application is a National Stage application of PCT/US2019/060981, filed Nov. 12, 2019, which claims the benefit of priority to U.S. Provisional Patent Application 62/760,565, filed Nov. 13, 2018, both of which are incorporated by reference in their entirety herein.

The field of art to which this invention generally pertains is products and methods of making products which are useful in fungicidal, insecticidal and herbicidal compositions.

TECHNICAL FIELD

Background

While many chemical products are known to be very useful as materials for herbicidal and insecticidal applications, because of their complexity, there is a constant search for ways to improve the efficiency and effectiveness of such products such as, for example, improving their stability and dispersibility.

BRIEF DESCRIPTION OF THE DRAWINGS

The FIGURE depicts a representative complex coacervation process for making products as described herein.

BRIEF SUMMARY

A composition particularly adapted for herbicidal use is described including one or more biopolymer containing micro-capsules containing one or more cyclohexanediones encapsulated therein, resulting in enhanced chemical stability and dispersibility of the encapsulated cyclohexanediones for such use.

Additional embodiments include, the composition described above where the cyclohexanedione comprises Clethodim; the composition described above where the biopolymer comprises polysaccharide and/or cellulose; the composition described above where the polysaccharide comprises Inulin; the composition described above including one or more surfactants; the composition described above where the cyclohexanediones are present in the micro-capsules in an amount of 1% to 70% by weight; the composition described above made by complex coacervation; the composition described above where the composition optionally contains one or more natural gum, starch, protein, alcohol, water soluble polymer, and/or an oil; the composition described above where the alcohol comprises Sorbitol; the composition described above where the natural gum comprises Gum Arabic; the composition described above where the surfactant comprises one or more polyalkylene oxide block copolymers; a water dispersion containing the composition described above; and an oil dispersion containing the composition described above; the composition described above where the oil comprises vegetable oil; the composition described above where the oil comprises soybean oil, pine oil, and/or sunflower oil; the composition described above where the oil comprises paraffinic oil; the composition described above where the oil comprises an aromatic solvent; the composition described above where the solvent comprises $C_9$ to $C_{10}$ dialkyl and trialky benzenes (such as, for example, Aromatic 100, Aromatic 150 or Aromatic 200); the composition described above where the vegetable oil comprises rapeseed oil/or methylated rapeseed oil; the composition described above where the oil comprises a polyoxyethylene sorbitan monolaurate with a carbon chain length varying from $C_{10}$ to $C_{20}$ (such as, for example, Tween® 80, or Tween® 20, or Tween® 85, or Tween® 60 (Sigma-Aldrich); the composition described above where the polyoxyethylene sorbitan is a monolaurate, monostearate, tristearate, and/or trioleate.

A method of controlling insects and/or weeds comprising applying the composition described above is also described.

Additional embodiments described include the method described above where the applying step is performed post-emergently after the crop breaks ground; and the method described above where the applying step is performed pre-emergently before the crop breaks ground.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

What is described herein is the encapsulation of cyclohexanediones to improve both their chemical stability and dispersibility, including improving their compatibility with other premix molecules and different mixtures, sustainable release, extend release profile, and longer crop protection, among others. Through the use of biopolymer encapsulation materials (such as polysaccharides and cellulose, for example—see also the tables), cyclohexanediones (such as Clethodim, for example) microcapsules are formed through conventional complex coacervation techniques. However, by carefully selecting this encapsulation technology and one or more appropriate surfactants, the new delivery system demonstrates many advantages, including the following to name just a few: significant chemical stability (e.g., for Clethodim, at least 2 weeks at 54° C. as compared to currently available Clethodim products); stability of microcapsules after aging at accelerated temperatures in either a dry form or an oil dispersion (e.g., for Clethodim products); high dispersibility of microcapsules in either aqueous phase or oil phase; controlled release of the encapsulated active ingredient; significantly high loading of active ingredient in either a dry form or an oil dispersion with a target of a practical formulation volume for the particular application method and, the oil phase acts as a built-in adjuvant for improving bio-efficacy for oil dispersions.

Example 1

A representative complex coacervation process with the selected appropriate surfactants is described below. See, also, the FIGURE. The composition materials are first hydrated and thoroughly mixed (1). The solutions are prepared by dispersing the composition materials in a concentration from 2% to 50% by weight based on their molecular weights and the desired viscosity of the final solutions, i.e. balanced viscosity for product handling and minimized phase separation. The solutions are gently stirred and stored, for example, overnight to ensure complete hydration of the biopolymers (2). Heat may be applied to enhance dissolving if necessary. The biopolymer solution or a mixture of biopolymer solutions are mixed in a beaker with appropriate surfactants (3). A Clethodim solution in a concentration from 50% to 80% is then metered into the breaker (4) and homogenized (5) for 10 minutes at 5,000 to 10,000 rpm (revolutions per minute) in a conventional mixer to generate micro-emulsions. The micro-emulsion mixture is further spray-dried (6) with an air flow whose inlet temperature is from 110° C. to 120° C. The microcapsule powder is collected and analyzed.

Example 2

Alternatively, the microcapsule powder can be further made into an Oil Dispersion by suspending the powder into one or more selected oils in a concentration from 20% to 90% under agitation. Optionally, one or more surfactants including dispersants, emulsifiers, rheology aids are added into the Oil Dispersion to stabilize the mixture. The oil dispersion is analyzed below.

Example 3

Representative encapsulation efficiency with various deliver systems is demonstrated below. To determine total oil content, 0.5 g (grams) the encapsulated powder is mixed with 10 ml (milliliters) of water and stirred for 2 minutes. 10 ml of isopropanol and hexane (1:1 to 1:3 ratio) is added and stirred for 5 minutes. The solution is then centrifuged, filtered and placed in a water bath at 70° C. to evaporate the solvent. The final weight of the oil is recorded. To determine surface oil content, 0.5 g of encapsulated powder is mixed with hexane, centrifuged and filtered. The supernatant is evaporated as above and the quantity of oil recorded. Results are given in Table 1 below.

TABLE 1

| Sample | A | B | C | D | E |
|---|---|---|---|---|---|
| Encapsulation Efficiency | 95.5% | 95.1% | 96.1% | 95.8% | 96.2% |

Example 4

Chemical retention of encapsulated Clethodim powder stored at 54° C. is compared with some commercial EC (emulsifiable concentrate) products currently on the market,

TABLE 2

| Sample | Commercial 1 [1] | Commercial 2 [2] | F | G | H | I | J | K |
|---|---|---|---|---|---|---|---|---|
| Day 7 | 87.3% | 90.7% | 96.0% | 99.7% | 98.5% | 97.7% | >100% | >100% |
| Day 14 | 87.2% | 88.2% | 92.4% | 94.3% | 94.6% | 93.5% | 95.3% | 96.1% |

Notes:

[1] The commercial EC product contains 120 g/L of Clethodim

[2] The commercial EC product contains 360 g/L of Clethodim

Chemical retention of encapsulated Clethodim oil dispersions stored at 54° C. is demonstrated in Table 3.

TABLE 3

| Sample | L | M | N | O |
|---|---|---|---|---|
| Stored for 7 Days | 97.3% | >100% | 99.8% | >100% |
| Stored for 14 Days | 97.7% | >100% | >100% | 98.6% |

Dispersibility at 2.5% OD (oil dispersion) in dilution in ASTM 100 milliliter graduated centrifuge tubes is demonstrated in Table 4.

TABLE 4

| Sample | Bloom | Number of inversions* | Sedimentation (ml) at time period (hours) | | | Comments after 24 hours | Number of inversions for Re-Dispersion (ASTM Testing Tube) |
|---|---|---|---|---|---|---|---|
| | | | 1 | 2 | 24 | | |
| P | Moderate | 3 | 0 | 0 | 0 | Slight creaming | 1 |
| Q | Good | 1 | 0 | 0 | 0 | Slight creaming | 1 |

*Inversion is to flip over testing tubes upside down to mix the solution to re-suspend or re-mix. The number of inversions is to evaluate the ease of re-mixing the solution. The lower the better.

Example 5

Representative emulsion-in-water compositions (before spray-drying) are shown in Tables 5 and 6. Representative compositions of encapsulated powder suspended in oil to form oil dispersions are shown in Table 7.

TABLE 5

| Formulation Component | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Clethodim (Cyclohexanedione) | 20 | 20 | 20 | 20 | 20 | 20 | 20 | 20 | 20 | 20 | 20 | 20 | 20 | 20 |
| Inulin Polysaccharide | 5 | 10 | 15 | — | — | — | 2.5 | 6.25 | 3.13 | 5 | 5 | 5 | 5 | 5 |
| Gum Arabic Natural Gum | 15 | 10 | 5 | 15 | 10 | 5 | 17.5 | 18.75 | 21.87 | 15 | 15 | 15 | 15 | 15 |
| Maltodextrin Polysaccharide | — | — | — | 5 | 10 | 15 | — | — | — | 2.5 | — | — | — | — |
| Waxy MaizeStarch/Polysaccharide | — | — | — | — | — | — | — | — | — | — | — | — | — | — |
| Whey Protein | — | — | — | — | — | — | — | — | — | — | 2.5 | — | — | — |
| Xylitol Sugar Alcohol | — | — | — | — | — | — | — | — | — | — | — | 2.5 | — | — |
| Sorbitol Sugar Alcohol | — | — | — | — | — | — | — | — | — | — | — | — | 2.5 | — |
| Mannitol Sugar Alcohol | — | — | — | — | — | — | — | — | — | — | — | — | — | 2.5 |
| Starch Polysaccharide | — | — | — | — | — | — | — | — | — | — | — | — | — | — |
| Cyclodextrin Cyclic oligosaccharide | — | — | — | — | — | — | — | — | — | — | — | — | — | — |
| Polyoxyethylene (20) sorbitan monolaurate surfactant | — | — | — | — | — | — | — | — | — | — | — | — | — | — |
| Alkylated vinylpyrrolidone polymer surfactant | — | — | — | — | — | — | — | — | — | — | — | — | — | — |
| Isopropyl alcohol | — | — | — | — | — | — | — | — | — | — | — | — | — | — |
| EO/PO (ethylene oxide/propylene oxide) block copolymer surfactant | — | — | — | — | — | — | — | — | — | — | — | — | — | — |
| EO/PO block copolymer surfactant | — | — | — | — | — | — | — | — | — | — | — | — | — | — |
| EO/PO block copolymer surfactant | — | — | — | — | — | — | — | — | — | — | — | — | — | — |
| EO/PO block copolymer surfactant | — | — | — | — | — | — | — | — | — | — | — | — | — | — |
| EO/PO block copolymer surfactant | — | — | — | — | — | — | — | — | — | — | — | — | — | — |
| EO/PO block copolymer surfactant | — | — | — | — | — | — | — | — | — | — | — | — | — | — |

TABLE 5-continued

| | | | | | | | | | | | | | | |
|---|---|---|---|---|---|---|---|---|---|---|---|---|---|---|
| Polyalkylene oxide block copolymer surfactant | — | — | — | — | — | — | — | — | — | — | — | — | — | — |
| EO/PO block copolymer surfactant | — | — | — | — | — | — | — | — | — | — | — | — | — | — |
| Nonionic block copolymer surfactant | — | — | — | — | — | — | — | — | — | — | — | — | — | — |
| Butyl block copolymer surfactant | — | — | — | — | — | — | — | — | — | — | — | — | — | — |
| Polyvinylpyrrolidone Water soluble polymer | — | — | — | — | — | — | — | — | — | — | — | — | — | — |
| Water | 60 | 60 | 60 | 60 | 60 | 60 | 60 | 55 | 55 | 57.5 | 57.5 | 57.5 | 57.5 | 57.5 |
| Total | 100 | 100 | 100 | 100 | 100 | 100 | 100 | 100 | 100 | 100 | 100 | 100 | 100 | 100 |

| Formulation Component | 15 | 16 | 17 | 18 | 19 | 20 | 21 | 22 | 23 | 24 | 25 | 26 | 27 |
|---|---|---|---|---|---|---|---|---|---|---|---|---|---|
| Clethodim (Cyclohexanedione) | 20 | 20 | 20 | 20 | 20 | 20 | 25 | 30 | 20 | 20 | 20 | 20 | 20 |
| Inulin Polysaccharide | 5 | — | 5 | 5 | 5 | 5 | 5 | 5 | 5 | 5 | 5 | 5 | 5 |
| Gum Arabic Natural Gum | 15 | — | 15 | 10 | 15 | 15 | 10 | 10 | 15 | 15 | 15 | 15 | 15 |
| Maltodextrin Polysaccharide | — | — | — | — | — | — | — | — | — | — | — | — | — |
| Waxy Maize Starch/Polysaccharide | — | — | — | — | — | — | — | — | — | — | — | — | — |
| Whey Protein | — | — | — | — | — | — | — | — | — | — | — | — | — |
| Xylitol Sugar Alcohol | — | — | — | — | — | — | — | — | — | — | — | — | — |
| Sorbitol Sugar Alcohol | — | — | 5 | 5 | — | — | — | 5 | 5 | 5 | 5 | 5 | 5 |
| Mannitol Sugar Alcohol | — | — | — | — | — | — | — | — | — | — | — | — | — |
| Starch Polysaccharide | 2.5 | — | — | — | — | — | — | — | — | — | — | — | — |
| Cyclodextrin Cyclic oligosaccharide | — | 20 | — | — | — | — | — | — | — | — | — | — | — |
| Polyoxyethylene (20) sorbitan monolaurate surfactant | — | 1 | — | — | — | — | — | — | — | 5 | — | — | — |
| Alkylated vinyl-pyrrolidone polymer surfactant | — | — | — | — | 1 | — | — | — | — | — | — | — | — |
| Isopropyl alcohol | — | — | — | — | — | 5 | — | — | — | — | — | — | — |
| EO/PO (ethylene oxide/propylene oxide) block copolymer surfactant | — | — | — | — | — | — | — | — | 5 | — | — | — | — |
| EO/PO block copolymer surfactant | — | — | — | — | — | — | — | — | — | 5 | — | — | — |
| EO/PO block copolymer surfactant | — | — | — | — | — | — | — | — | — | — | — | — | — |
| EO/PO block copolymer surfactant | — | — | — | — | — | — | — | — | — | — | 5 | — | — |
| EO/PO block copolymer surfactant | — | — | — | — | — | — | — | — | — | — | — | 5 | — |
| EO/PO block copolymer surfactant | — | — | — | — | — | — | — | — | — | — | — | — | 5 |
| EO/PO block copolymer surfactant | — | — | — | — | — | — | — | — | — | — | — | — | — |
| Polyalkylene oxide block copolymer surfactant | — | — | — | — | — | — | — | — | — | — | — | — | — |
| EO/PO block copolymer surfactant | — | — | — | — | — | — | — | — | — | — | — | — | — |
| Nonionic block copolymer surfactant | — | — | — | — | — | — | — | — | — | — | — | — | — |
| Butyl block copolymer surfactant | — | — | — | — | — | — | — | — | — | — | — | — | — |
| Polyvinylpyrrolidone Water soluble polymer | — | — | — | — | — | — | — | — | — | — | — | — | — |
| Water | 57.5 | 59 | 55 | 60 | 59 | 55 | 55 | 50 | 50 | 50 | 50 | 50 | 50 |
| Total | 100 | 100 | 100 | 100 | 100 | 100 | 100 | 100 | 100 | 100 | 100 | 100 | 100 |

| Formulation Component | 28 | 29 | 30 | 31 | 32 | 33 | 34 | 35 | 36 | 37 | 38 | 39 |
|---|---|---|---|---|---|---|---|---|---|---|---|---|
| Clethodim (Cyclohexanedione) | 20 | 20 | 20 | 20 | 20 | 20 | 20 | 25 | 30 | 20 | 20 | 20 |
| Inulin Polysaccharide | 5 | 5 | 5 | 5 | 5 | 5 | 5 | — | 5 | 5 | — | 5 |
| Gum Arabic Natural Gum | 15 | 15 | 15 | 15 | 15 | 15 | 15 | 10 | 15 | 20 | 10 | 10 |
| Maltodextrin Polysaccharide | — | — | — | — | — | — | — | — | — | — | — | — |
| Waxy Maize Starch/Polysaccharide | — | — | — | — | — | — | — | 10 | 5 | 10 | 10 | 10 |
| Whey Protein | — | — | — | — | — | — | — | — | — | — | — | — |
| Xylitol Sugar Alcohol | — | — | — | — | — | — | — | — | — | — | — | — |
| Sorbitol Sugar Alcohol | 5 | 5 | — | 5 | 5 | — | 5 | — | — | — | — | — |
| Mannitol Sugar Alcohol | 5 | — | — | — | — | — | — | — | — | — | — | — |
| Starch Polysaccharide | — | — | — | — | — | — | — | — | — | — | — | — |

TABLE 5-continued

| Formulation Component | | | | | | | | | | | | |
|---|---|---|---|---|---|---|---|---|---|---|---|---|
| Cyclodextrin Cyclic oligosaccharide | — | — | — | — | — | — | — | — | — | — | — | — |
| Polyoxyethylene (20) sorbitan monolaurate surfactant | — | — | — | — | — | — | — | — | — | — | — | — |
| Alkylated vinyl-pyrrolidone polymer surfactant | — | — | — | — | — | — | — | — | — | — | — | — |
| Isopropyl alcohol | — | — | — | — | — | — | 5 | — | — | — | — | — |
| EO/PO (ethylene oxide/propylene oxide) block copolymer surfactant | — | — | — | — | 2.5 | 7.5 | 10 | 10 | 5 | 5 | — | — |
| EO/PO block copolymer surfactant | — | — | — | — | — | — | — | — | — | — | — | — |
| EO/PO block copolymer surfactant | — | 5 | — | — | — | — | — | — | — | — | — | — |
| EO/PO block copolymer surfactant | — | — | — | — | — | — | — | — | — | — | — | 5 |
| EO/PO block copolymer surfactant | — | — | — | — | — | — | — | — | — | — | — | — |
| EO/PO block copolymer surfactant | — | — | — | — | — | — | — | — | — | — | — | — |
| EO/PO block copolymer | — | — | — | — | — | — | — | — | — | — | — | — |
| EO/PO block copolymer surfactant | 5 | — | — | — | — | — | — | — | — | — | — | — |
| EO/PO block copolymer surfactant | — | — | — | — | — | — | — | — | — | — | — | — |
| Polyalkylene oxide block copolymer surfactant | — | — | — | — | 2.5 | 7.5 | 10 | 10 | 5 | 5 | — | — |
| EO/PO block copolymer surfactant | — | — | — | 5 | — | — | — | — | — | — | — | — |
| Nonionic block copolymer surfactant | — | — | — | — | — | — | — | — | — | — | — | — |
| Butyl block copolymer surfactant | — | — | — | — | — | — | — | — | — | — | — | — |
| Polyvinylpyrrolidone Water soluble polymer | — | — | — | — | — | — | — | — | — | — | — | — |
| Water | 50 | 50 | 50 | 50 | 52.5 | 47.5 | 45 | 55 | 50 | 40 | 60 | 55 |
| Total | 100 | 100 | 100 | 100 | 100 | 100 | 100 | 100 | 100 | 100 | 100 | 100 |

| Formulation Component | 40 | 41 | 42 | 43 | 44 | 45 | 46 | 47 | 48 | 49 | 50 | 51 |
|---|---|---|---|---|---|---|---|---|---|---|---|---|
| Clethodim (Cyclohexanedione) | 20 | 20 | 20 | 20 | 20 | 20 | 20 | 20 | 20 | 20 | 20 | 20 |
| Inulin Polysaccharide | 5 | 5 | 5 | 5 | 5 | 5 | 5 | 5 | 5 | 5 | 5 | 5 |
| Gum Arabic Natural Gum | 10 | 10 | — | 15 | 15 | 15 | 15 | 15 | 15 | 15 | 15 | 15 |
| Maltodextrin Polysaccharide | — | — | — | — | — | — | — | — | — | — | — | — |
| Waxy MaizeStarch/Polysaccharide | 10 | 10 | — | — | — | — | — | — | — | — | — | — |
| Whey Protein | — | — | — | — | — | — | — | — | — | — | — | — |
| Xylitol Sugar Alcohol | — | — | — | — | — | — | — | — | — | — | — | — |
| Sorbitol Sugar Alcohol | 5 | 5 | — | 5 | 5 | 5 | 5 | 5 | 5 | 5 | 5 | 5 |
| Mannitol Sugar Alcohol | — | — | — | — | — | — | — | — | — | — | — | — |
| Starch Polysaccharide | — | — | — | — | — | — | — | — | — | — | — | — |
| Cyclodextrin Cyclic oligosaccharide | — | — | — | — | — | — | — | — | — | — | — | — |
| Polyoxyethylene (20) sorbitan monolaurate surfactant | — | — | — | — | — | — | — | — | — | — | — | — |
| Alkylated vinyl-pyrrolidone polymer surfactant | — | — | — | — | — | — | — | — | — | — | — | — |
| Isopropyl alcohol | — | — | — | — | — | — | — | — | — | — | — | — |
| EO/PO (ethylene oxide/propylene oxide) block copolymer surfactant | — | — | — | — | — | — | — | — | — | — | — | — |
| EO/PO block copolymer surfactant | — | — | — | — | — | — | — | — | — | — | — | — |
| EO/PO block copolymer surfactant | — | — | — | — | — | — | — | — | — | — | — | — |
| EO/PO block copolymer surfactant | — | — | — | — | — | — | — | — | — | — | — | — |
| EO/PO block copolymer surfactant | 5 | — | — | — | — | — | — | — | — | — | — | — |
| EO/PO block copolymer surfactant | — | 5 | — | — | — | — | — | — | — | — | — | — |
| EO/PO block copolymer | — | — | — | — | — | — | — | — | — | — | — | — |
| EO/PO block copolymer surfactant | — | — | — | — | — | — | — | — | — | — | — | — |

TABLE 5-continued

| | | | | | | | | | | | | |
|---|---|---|---|---|---|---|---|---|---|---|---|---|
| Polyalkylene oxide block copolymer surfactant | — | — | — | — | — | — | — | — | — | — | — | — |
| EO/PO block copolymer surfactant | — | — | — | — | — | — | — | — | — | — | — | — |
| Nonionic block copolymer surfactant | — | — | 1 | 1 | 1.5 | 1 | 2.5 | 0.75 | 0.5 | — | — | — |
| Butyl block copolymer surfactant | — | — | 1 | 2.5 | 2.5 | 5 | 5 | 1 | 1 | — | — | — |
| Polyvinylpyrrolidone Water soluble polymer | — | — | — | — | — | — | — | — | — | 1 | 2.5 | 5 |
| Water | 50 | 45 | 58 | 51.5 | 51 | 49 | 47.5 | 53.25 | 53.5 | 54 | 52.5 | 50 |
| Total | 100 | 100 | 100 | 100 | 100 | 100 | 100 | 100 | 100 | 100 | 100 | 100 |

TABLE 6

| Formulation Component | 52 | 53 | 54 | 55 | 56 | 57 | 58 | 59 | 60 | 61 | 62 |
|---|---|---|---|---|---|---|---|---|---|---|---|
| Clethodim (Cyclohexanedione) | 20 | 20 | 20 | 20 | 20 | 20 | 20 | 20 | 20 | 20 | 20 |
| Inulin Polysaccharide | 5 | 5 | 5 | 5 | — | — | — | — | — | — | 5 |
| Gum Arabic Natural Gum | 15 | 15 | 15 | 15 | 15 | 15 | 15 | 15 | 15 | 15 | 15 |
| Maltodextrin Polysaccharide | — | — | — | — | — | 5 | — | — | — | — | — |
| Waxy Maize Starch/Polysaccharide | — | — | — | — | — | — | — | — | — | — | — |
| Whey Protein | — | — | — | — | — | — | — | — | — | — | — |
| Xylitol Sugar Alcohol | — | — | — | — | — | — | — | — | — | — | — |
| Sorbitol Sugar Alcohol | 5 | 5 | 5 | 5 | 5 | 5 | 5 | 5 | 5 | 5 | 5 |
| Mannitol Sugar Alcohol | — | — | — | — | — | — | — | — | — | — | — |
| Starch Polysaccharide | — | — | — | — | — | — | — | — | — | — | — |
| Cyclodextrin Cyclic oligosaccharide | — | — | — | — | — | — | — | — | — | 5 | — |
| Chitosan | — | — | — | — | — | — | — | 5 | — | — | — |
| Gelatin | — | — | — | — | — | — | — | — | 5 | — | — |
| Microcrystalline Cellulose | — | — | — | — | — | — | — | — | — | 5 | — |
| Polyoxyethylene (20) sorbitan monolaurate surfactant | — | — | — | — | — | — | — | — | — | — | — |
| Alkylated vinyl-pyrrolidone polymer surfactant | — | — | — | — | — | — | — | — | — | — | — |
| Isopropyl alcohol | — | — | — | — | — | — | — | — | — | — | — |
| EO/PO (ethylene oxide/propylene oxide) block copolymer surfactant | — | — | — | — | — | — | — | — | — | — | — |
| EO/PO block copolymer surfactant | — | — | — | — | — | — | — | — | — | — | — |
| EO/PO block copolymer surfactant | — | — | — | — | — | — | — | — | — | — | — |
| EO/PO block copolymer surfactant | — | — | — | — | — | — | — | — | — | — | — |
| EO/PO block copolymer surfactant | — | — | — | — | — | — | — | — | — | — | — |
| EO/PO block copolymer surfactant | — | — | — | — | — | — | — | — | — | — | — |
| EO/PO block copolymer surfactant | — | — | — | — | — | — | — | — | — | — | — |
| Polyalkylene oxide block copolymer surfactant | — | — | — | — | — | — | — | — | — | — | — |
| EO/PO block copolymer surfactant | — | — | — | — | — | — | — | — | — | — | — |
| Nonionic block copolymer surfactant | — | — | — | — | — | — | — | — | — | — | — |
| Alkyl Polysaccharide | — | — | — | 1 | — | — | — | — | — | 1 | — |
| Polymeric Dispersant - Croda Atlox PN-100 | — | — | — | 1 | — | — | — | — | — | — | — |
| Butyl block copolymer surfactant | — | — | — | — | — | — | — | — | — | — | — |
| Polyvinylpyrrolidone Water soluble polymer | 1 | 2.5 | 5 | — | — | — | — | — | — | — | — |
| Water | 49 | 47.5 | 45 | 48 | 50 | 50 | 50 | 50 | 50 | 50 | 49 |
| Total | 100 | 100 | 100 | 100 | 100 | 100 | 100 | 100 | 100 | 100 | 100 |

TABLE 7

| Formulation Component | 63 | 64 | 65 | 66 | 67 | 68 | 69 | 70 | 71 | 72 |
|---|---|---|---|---|---|---|---|---|---|---|
| Clethodim (Cyclohexanedione) | 9.1 | 10 | 10 | 10 | 1.7 | 1.7 | 9.7 | 9.7 | 9.7 | 9.7 |
| Inulin Polysaccharide | 2.3 | 2.5 | 2.5 | 2.5 | 0.4 | 0.4 | 2.4 | 2.4 | 2.4 | 2.4 |
| Gum Arabic Natural Gum | 6.8 | 7.5 | 7.5 | 7.5 | 1.3 | 1.3 | 7.3 | 7.3 | 7.3 | 7.3 |
| Sorbitol Sugar Alcohol | 2.3 | 2.5 | 2.5 | 2.5 | — | — | 2.4 | 2.4 | 2.4 | 2.4 |
| EO/PO (ethylene oxide/propylene oxide) block copolymer surfactant | — | 2.5 | — | — | — | — | — | — | — | — |
| Polyalkylene oxide block copolymer surfactant | — | — | 2.5 | — | — | — | — | — | — | — |
| EO/PO block copolymer surfactant | — | — | — | 2.5 | — | — | — | — | — | — |
| Nonionic block copolymer surfactant | — | — | — | — | 0.1 | 5.1 | — | — | — | — |
| Butyl block copolymer surfactant | — | — | — | — | 0.1 | 5.1 | — | — | — | — |
| Polyvinylpyrrolidone Water soluble polymer | — | — | — | — | — | — | — | — | — | — |
| Anionic polymeric dispersant | 5 | 5 | 5 | 5 | — | — | 5 | 5 | 5 | 5 |
| Cetyl ether phosphate surfactant | 5 | 5 | 5 | 5 | — | — | 5 | — | — | — |
| Oleyl ether phosphate surfactant | — | — | — | — | — | — | — | 5 | — | — |
| Polyoxyethylene (5) oleyl mono/di-phosphate surfactant | — | — | — | — | — | — | — | — | 5 | — |
| Polyoxyethylene (3) oleyl mono/di-phosphate surfactant | — | — | — | — | — | — | — | — | — | 5 |
| Sodium dioctyl-sulfosuccinate surfactant | — | — | — | — | — | — | — | — | — | — |
| Polyoxyethylene (40) sorbitol hexaoleate surfactant | — | — | — | — | — | — | — | — | — | — |
| Ethoxylated castor oil | — | — | — | — | — | — | — | — | — | — |
| Rapeseed oil fatty acid methyl ester | 78 | 65 | 65 | 65 | 96 | 86 | 68 | 68 | 68 | 68 |
| Total | 100 | 100 | 100 | 100 | 100 | 100 | 100 | 100 | 100 | 100 |

| Formulation Component | 73 | 74 | 75 | 76 | 77 | 78 | 79 | 80 | 81 | 82 |
|---|---|---|---|---|---|---|---|---|---|---|
| Clethodim (Cyclohexanedione) | 15.2 | 15.6 | 16.4 | 14.9 | 14.9 | 14.9 | 14.9 | 14.9 | 14.9 | 14.9 |
| Inulin Polysaccharide | 3.8 | 3.9 | 4.1 | 3.7 | 3.7 | 3.7 | 3.7 | 3.7 | 3.7 | 3.7 |
| Gum Arabic Natural Gum | 11.4 | 11.7 | 12.3 | 11.2 | 11.2 | 11.2 | 11.2 | 11.2 | 11.2 | 11.2 |
| Sorbitol Sugar Alcohol | 3.8 | 3.9 | 4.1 | 3.7 | 3.7 | 3.7 | 3.7 | 3.7 | 3.7 | 3.7 |
| EO/PO (ethylene oxide/propylene oxide) block copolymer surfactant | — | — | — | — | — | — | — | — | — | — |
| Polyalkylene oxide block copolymer surfactant | — | — | — | — | — | — | — | — | — | — |
| EO/PO block copolymer surfactant | — | — | — | — | — | — | — | — | — | — |
| Nonionic block copolymer surfactant | — | — | — | — | — | — | — | — | — | — |
| Butyl block copolymer surfactant | — | — | — | — | — | — | — | — | — | — |
| Polyvinylpyrrolidone Water soluble polymer | 0.8 | 2.0 | 4.1 | — | — | — | — | — | — | — |
| Anionic polymeric dispersant | 5 | 5 | 5 | — | — | — | — | — | — | — |
| Cetyl ether phosphate surfactant | 5 | 5 | 5 | — | — | — | — | — | — | — |
| Oleyl ether phosphate surfactant | — | — | — | — | — | — | — | — | — | — |
| Polyoxyethylene (5) oleyl mono/di-phosphate surfactant | — | — | — | — | — | — | — | — | — | — |
| Polyoxyethylene (3) oleyl mono/di-phosphate surfactant | — | — | — | — | — | — | — | — | — | — |
| Sodium dioctyl-sulfosuccinate surfactant | — | — | — | 3 | 3 | 3 | — | — | — | — |

TABLE 7-continued

| | | | | | | | | | | |
|---|---|---|---|---|---|---|---|---|---|---|
| Polyoxyethylene (40) sorbitol hexaoleate surfactant | — | — | — | 4.5 | 4.5 | — | 4.5 | 5.6 | 3.8 | 1.9 |
| Ethoxylated castor oil | — | — | — | 3 | — | 3 | 3 | 1.9 | 3.8 | 1.9 |
| Rapeseed oil fatty acid methyl ester | 55 | 53 | 53 | 55.5 | 59 | 60 | 59 | 59 | 59 | 59 |
| Total | 100 | 100 | 100 | 100 | 100 | 100 | 100 | 100 | 100 | 100 |

As demonstrated by the tables above, the water based dispersions can contain functional materials such as: Cyclohexanediones such as Clethodim, Polysaccharides such as Inulin, Natural gums such as Gum Arabic, Polysaccharides such as maltodextrin, starches and polysaccharides such as Waxy Maize Starch, proteins such as Whey Protein, Sugar Alcohols such as Sorbitol and Mannitol, Polysaccharide starches, Cyclic oligosaccharide such as Cyclodextrin; conventional surfactants such as Polyoxyethylene (20) sorbitan monolaurate, Alkylated vinyl-pyrrolidone polymer, Isopropyl alcohol, EO/PO (ethylene oxide/propylene oxide) block copolymer, Anionic polymeric dispersant Polyalkylene oxide block copolymer, nonionic block copolymer, Butyl block copolymer. and Polyvinylpyrrolidone Water soluble polymer.

As also demonstrated by the tables above, the oil based dispersions can also contain functional materials such as: conventional surfactants such as EO/PO (ethylene oxide/propylene oxide) block copolymer, Polyalkylene oxide block copolymer, EO/PO block copolymer, nonionic block copolymer, Butyl block copolymer, Polyvinylpyrrolidone Water soluble polymer, anionic polymeric dispersant, cetyl ether phosphate, oleyl ether phosphate, polyoxyethylene (5) oleyl mono/di-phosphate, polyoxyethylene (3) oleyl mono/di-phosphate, sodium dioctyl-sulfosuccinate, polyoxyethylene (40) sorbitol hexaoleate, ethoxylated castor oil and rapeseed oil fatty acid methyl ester.

These examples are merely illustrations and are not to be understood as limiting the scope and underlying principles of the invention in any way. Various modifications of the invention in addition to those shown and described herein will become apparent to those skilled in the art form after the following examples and foregoing description. Such modifications are also intended to fall within the scope of the appended claims.

As described herein, these problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cyclohexanedione composition for herbicidal use, comprising clethodim encapsulated with a biopolymer microcapsule, wherein the biopolymer microcapsule is made by complex coacervation and the biopolymer comprises inulin.

2. The composition of claim 1, further including one or more surfactants, optionally wherein the one or more surfactants comprise one or more polyalkylene oxide block copolymers.

3. The composition of claim 1, wherein the clethodim is present in the micro-capsules in an amount of 1% to 70% by weight.

4. The composition of claim 1, wherein the composition further contains one or more of a natural gum, starch, a protein, an alcohol, a water soluble polymer, and/or an oil.

5. The composition of claim 4, wherein the alcohol comprises sorbitol.

6. The composition of claim 4 wherein the natural gum comprises gum arabic.

7. A water dispersion containing the composition of claim 1.

8. An oil dispersion containing the composition of claim 1.

9. The oil dispersion of claim 8, wherein the oil comprises a vegetable oil, soybean oil, pine oil, sunflower oil, rapeseed oil, and/or methylated rapeseed pill, paraffinic oil or combinations comprising at least one of the foregoing.

10. The oil dispersion of claim 8, wherein the oil comprises an aromatic solvent, optionally wherein the solvent comprises $C_9$ to $C_{10}$ dialkyl and trialky benzenes.

11. The oil dispersion of claim 8, wherein the oil comprises a polyoxyethylene sorbitan monolaurate with a carbon chain length varying from $C_{10}$ to $C_{20}$; optionally wherein the polyoxyethylene sorbitan is a monolaurate, monostearate, tristearate, and/or trioleate.

12. A method of controlling insects and/or weeds in a crop comprising applying the composition of claim 1 to the crop.

13. The method of claim 12, where the applying step is performed post-emergently after the crop breaks ground.

14. The method of claim 12, where the applying step is performed pre-emergently before the crop breaks ground.

* * * * *